United States Patent
Scholtz et al.

(10) Patent No.: US 7,620,517 B2
(45) Date of Patent: Nov. 17, 2009

(54) REAL-TIME POWER-LINE SAG MONITORING USING TIME-SYNCHRONIZED POWER SYSTEM MEASUREMENTS

(75) Inventors: Ernst Scholtz, Raleigh, NC (US);
Reynaldo F. Nuqui, Cary, NC (US);
Danny Julian, Willow Springs, NC (US); Alan R. Grightmire, Apex, NC (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 11/671,098

(22) Filed: Feb. 5, 2007

(65) Prior Publication Data

US 2008/0189061 A1 Aug. 7, 2008

(51) Int. Cl.
*G01K 7/00* (2006.01)
(52) U.S. Cl. ...................................... 702/130
(58) Field of Classification Search ............... 702/57, 702/64, 65, 90, 97, 99, 104, 130, 132, 136, 702/183; 324/127, 765; 73/862.391; 340/657
See application file for complete search history.

(56) References Cited

U.S. PATENT DOCUMENTS

| | | | | |
|---|---|---|---|---|
| 3,676,578 | A * | 7/1972 | Cahill | 174/128.1 |
| 5,181,026 | A * | 1/1993 | Granville | 340/870.28 |
| 5,235,861 | A | 8/1993 | Seppa | |
| 5,517,864 | A * | 5/1996 | Seppa | 73/862.391 |
| 5,918,288 | A | 6/1999 | Seppa | |
| 5,933,355 | A | 8/1999 | Deb | |
| 6,205,867 | B1 * | 3/2001 | Hayes et al. | 73/862.391 |
| 6,229,451 | B1 * | 5/2001 | Brown | 340/657 |
| 6,304,838 | B1 * | 10/2001 | Brown | 703/18 |
| 6,441,603 | B1 | 8/2002 | Lawry | |
| 7,093,416 | B2 * | 8/2006 | Johnson et al. | 57/212 |
| 2005/0222808 | A1 * | 10/2005 | Zima et al. | 702/182 |
| 2007/0038396 | A1 * | 2/2007 | Zima et al. | 702/65 |
| 2007/0200556 | A1 * | 8/2007 | Engelhardt | 324/158.1 |

OTHER PUBLICATIONS

Leonard Lee Grigsby, The Electric Engineering Handbook, 2000, CRC Press, 4-99 and 4-100.*
IEEE Standards Board, IEEE Standard for Calculating the Current-Temperature Relationship of Bare Overhead Conductors, IEEE Std 738-1993, approved Jun. 17, 1993, Cover p.-47.
Seppa, et al., Accurate Ampacity Determination: Temperature—Sag Model for Operational Real Time Ratings, IEEE Transactions on Power Delivery, Jul. 1995, pp. 1460-1470, vol. 10, No. 3.

(Continued)

*Primary Examiner*—Edward Raymond
*Assistant Examiner*—Mohamed Charioui
(74) *Attorney, Agent, or Firm*—Driggs, Hogg, Daugherty & DelZoppo Co., L.P.A.; Paul R. Katterle

(57) ABSTRACT

A sag calculator (112) computes sag for a span of a line section based at least in part upon an average temperature of the conductors in the line section. A temperature calculator (110) determines the temperature by ascertaining an ohmic resistance of the conductor lines based at least in part upon time-synchronized power system voltage and current measurements such as (but not limited to) phasor measurements generated by phasor measurement units (104, 106). The temperature calculator (110) determines the temperature as a function of the ohmic resistance.

27 Claims, 2 Drawing Sheets

OTHER PUBLICATIONS

Douglass, et al., Field Studies of Dynamic Thermal Rating Methods for Overhead Lines, IEEE Transmission and Distribution Conference 1999, Apr. 11-16, 1999, pp. 842-851, vol. 2.

IEEE Task Force "Bare Conductor Sag at High Temperature", Limitations of the Ruling Span Method for Overhead Line Conductors at High Operating Temperatures, IEEE Transactions on Power Delivery, Apr. 1999, pp. 549-560, vol. 14, No. 2.

Fink, et al., Standard Handbook for Electrical Engineers, Oct. 1999, 14-41-14-112, Fourteenth Edition, McGraw-Hill.

Holbert, et al., Prospects for Dynamic Transmission Circuit Ratings, ISCAS 2001. The 2001 IEEE International Symposium on Circuits and Systems, 2001, May 6-9, 2001, pp. III-205-III-208, vol. 2.

Olsen, et al., A New Method for Real-Time Monitoring of High-Voltage Transmission-Line Conductor Sag, IEEE Transactions on Power Delivery, Oct. 2002, pp. 1142-1152, vol. 17, No. 4.

Power Technologies, Inc., Increasing Power Transfer Capability of Existing Transmission Lines, presentation, 2003, slides 1-51.

United States Department of Agricultuer Rual Utilities Service, The Mechanics of Overhead Distribution Line Conductors, Bulletin 1724E-152, Jul. 30, 2003, pp. 1-20.

Dale Douglass, Sag-tension Calculation, A Tutorial Developed for the IEEE TP & C Line Design Subcommittee, based on CIGRE WG B2.12 Technical Brochure under Development, Jun. 13, 2005, 33 pages.

The Aluminum Association, "Aluminum Electrical Conductor Handbook", p. 3-10, New York, 1971.

A.K. Deb, "Powerline Ampacity System - Theory, Modeling, and Applications", pp. 27-59, CRC Press, 2000.

EDM International, Inc., "Introducing the Sagometer", brochure, Aug. 2002.

Chris Mensah-Bonsu, "Instrumentation and Measurement of Overhead Conductor Sag using the Differential Global Positioning Satellite System", PhD Thesis, Arizona State University, Tempe, Arizona, Aug. 2000.

\* cited by examiner

REAL-TIME POWER-LINE SAG MONITORING USING TIME-SYNCHRONIZED POWER SYSTEM MEASUREMENTS

BACKGROUND

The present application relates to monitoring and calculating line sag in electrical power transmission and distribution systems.

Wire conductors in power line sections are typically designed to maintain a certain clearance from vegetation, structures, or other objects, such that a flashover does not occur. Accordingly, designers determine a maximum amount of acceptable sag in connection with the design of power lines, wherein the amount of sag is affected by various factors such as (but not limited to) the temperature of the conductor, ambient temperature, conductor material, weight of the conductor, etc. With more specificity, when power lines are electrically loaded, the temperature of these lines increases as current increases, leading to thermal elongation of the power lines. This thermal elongation results in increased sag per power-line span, which in turn reduces clearance between conductors and objects below.

Recently, devices have been placed locally at specific power line spans to calculate line sag for a span by using local measurements. For example, a mechanical device that measures changes in line tension can be placed at a span of interest. These measured changes in tension can be employed to compute the line temperature at the particular span, which in turn can be utilized to calculate the sag of the power line at the span. In another example, a temperature sensing device has been used to measure surface temperature of the conductor at a specific location on the power line. Again, the sensed temperature can be utilized to compute sag of a power line of the span where the temperature is ascertained.

In still yet another example, video equipment has been placed proximate to a power line span where sag is desirably determined, such that the video equipment is directed towards a reflective target placed on the power-line span. Images generated by the video equipment can then be analyzed to determine sag at this power-line span. In a similar system, it is proposed that a Global Positioning System (GPS) receiver be placed on a certain power line span of interest, such that as the line sag changes the GPS receiver's position in space changes accordingly.

While the use of these systems has proven effective, each of these systems include devices that have been placed locally at a span of interest; therefore, costs are incurred in that installation and maintenance of these devices has to be undertaken at the span of interest. Additionally, power lines may need to be de-energized and taken out of service to install one or more devices of the systems. Still further, such devices are prone to being struck by lightning and are subject to other suboptimal weather conditions.

SUMMARY

Aspects of the present application address these matters, and others.

According to an aspect a method includes receiving a conductor temperature of a power line, wherein the temperature is determined based at least in part upon time-synchronized voltage and current phasor measurements. The method also includes computing sag for a span of interest in the power line based at least in part upon the received temperature.

According to another aspect, an apparatus includes a sag calculator that computes a sag for a span of a power line based at least in part upon a temperature of a conductor in the power line, wherein the temperature is a function of phasor measurements generated by one or more devices at vertices of the power line.

According to yet another aspect, a computer-readable medium includes computer-executable instructions for calculating sag for a span of a power line based at least in part upon a temperature of conductors in the line section, wherein the temperature is ascertained through analysis of one of more phasor measurements. The instructions also include storing the calculated sag.

Those skilled in the art will appreciate still other aspects of the present application upon reading and understanding the attached figures and description.

FIGURES

The present application is illustrated by way of example and not limitation in the figures of the accompanying drawings, in which like references indicate similar elements and in which.

DESCRIPTION

Time signals measured in a power system network, in their ideal form, are sinusoidal and for instance the voltage at a particular node as a function of time ideally would be of the form:

$$v_i(t) = \sqrt{2} V_i \cos(2\pi f_{sys} t + \theta_i) \qquad \text{Equation 1}$$

where i is the node, t is time, $v_i(t)$ is the time varying voltage, $V_i$ is the root mean square (RMS) magnitude of the voltage, $f_{sys}$ is the system frequency, and $\theta_i$ is a phase angle. Phasor calculus is used to simplify power system analysis. The RMS magnitude and the phase angle of the voltage signal $v_i(t)$ are gathered to form a phasor $\tilde{V} = V_i e^{\sqrt{-1}\theta_i}$, which is a complex number that has an equivalent real and imaginary component.

Figure 1:
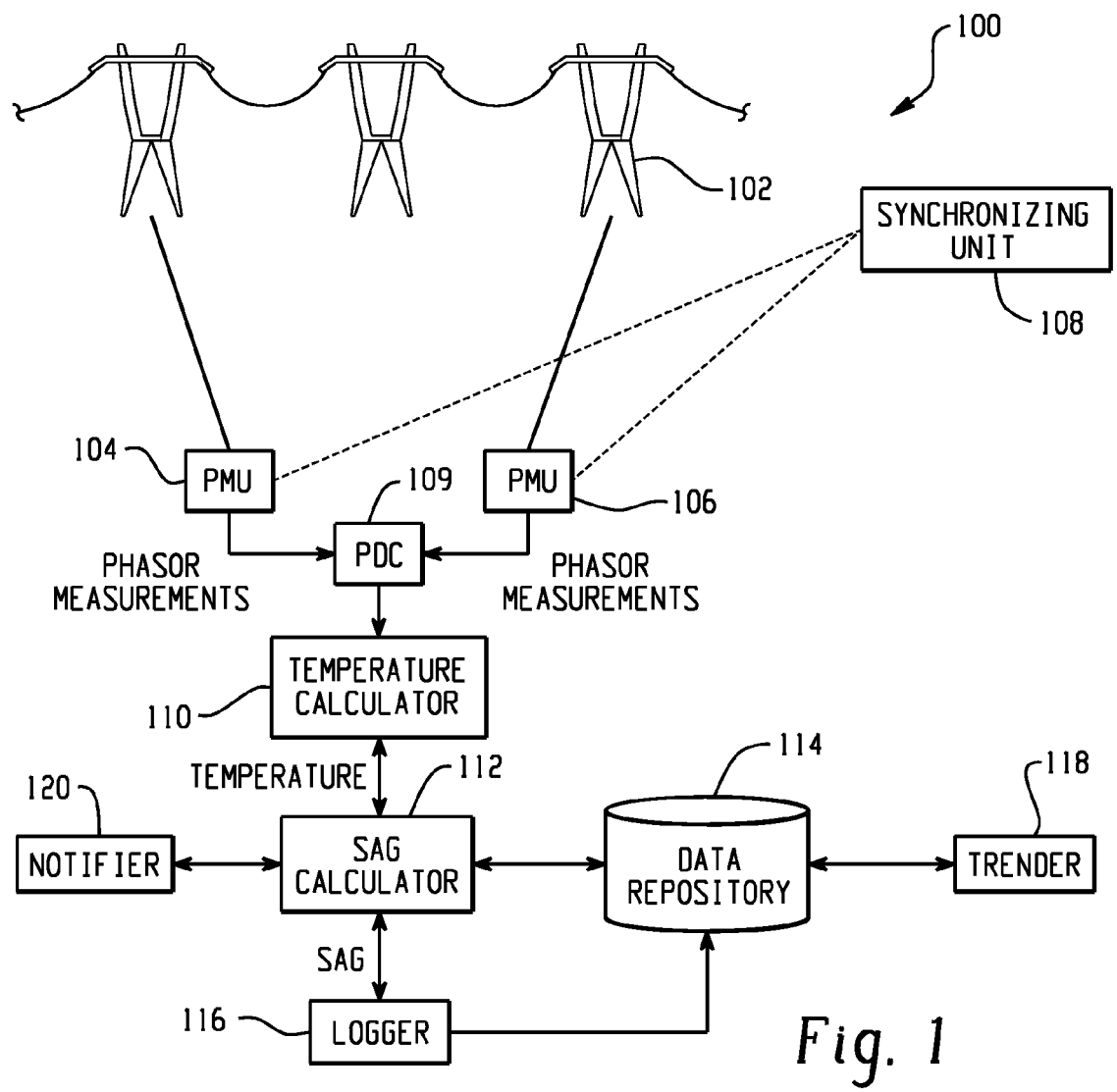
FIG. 1 depicts a system that facilitates computing an estimate of sag for a span of a power line.

With reference to FIG. 1, an electrical power system 100 includes a power line 102 that includes multiple line spans, wherein the power line 102 can include transmission or distribution lines. Additionally, the power line 102 may be all or part of a power-transfer corridor. In an example, phasor measurement units (PMUs) 104 and 106, respectively, can be placed at terminating vertices of the power line 102 that has no branching points between its terminating vertices. It is understood, however, that any suitable device that can ascertain time-synchronized voltage and current (phasor) information with respect to at least a portion of the power line 102 is contemplated by the inventors and intended to fall under the scope of the hereto-appended claims. Number and placement of measurement devices that can determine time-synchronized voltage and current information, such as the PMUs 104 and 106, can be a function of network topology, system observability, economics, and other relevant factors. Thus, the PMUs 104 and 106 are provided as an example, as they can be replaced with one or more measuring devices that ascertain time-synchronized voltage and current information. A synchronizing unit (or standard) 108 synchronizes the PMUs 104 and 106 in time. Additionally, the PMUs 104 and 106 are in communication with a phasor data concentrator (PDC) 109 that synchronizes the phasor measurements from the PMUs 104 and 106 using time-tags from the synchronizing unit 108. In an example, the PDC 109 can synchronize phasor measurements by aligning phasor data packets with identical time tags. In another example, the PDC 109 can use interpolation techniques to estimate missing phasor measurements, such as due to data communication problems. The PDC 109 is in communication with the temperature calculator 110, such that the synchronized phasor measurements generated by the PMUs 104 and 106 are received at the temperature calculator 110.

The temperature calculator 110 uses time-synchronized measurements generated by the PMUs 104 and 106 (or other suitable devices) and aligned by the PDC 109 to determine a temperature for conductor sections of the power line 102. For instance, the temperature may be an average temperature for the conductor lines in the power line 102. A sag calculator 112 receives the temperature from the temperature calculator 110 and further receives data relating to the power line 102 from a data repository, wherein the received data can include information such as length of spans of the power line 102. Based at least in part upon the received temperature and data relating to the power line 102, the sag calculator 112 calculates a metric for sag with respect to at least one span of the power line 102 in real-time.

The system 100 may additionally include a logger 116 that logs sags computed by the sag calculator 112 and stores the computed sags within the data repository 114 or other suitable data repository. A trender 118 may optionally be included within the system 100, wherein the trender 118 analyzes data logged by the logger 116 to discern patterns or trends in such data. Additionally, the system 100 may include a notifier 120 that can generate and transmit notifications to an operator, a computer, or an operator and a computer.

As alluded to above, the PMUs 104 and 106 monitor the line section 102 and obtain phasor measurements with respect thereto, wherein the phasor measurements can be voltage phasors, current phasors, or phasors that are representative of power. The PMUs 104 and 106 can be located at substations or other desired locations. The synchronizing unit 108 serves to synchronize the PMUs 104 and 106, such that phasor measurements output by the PMUs 104 and 106 refer to a common phase reference. In an example, the synchronizing unit 108 can utilize Global Positioning System (GPS) technology, which provides a common temporal reference for phasor measurements generated by the PMUs 104 and 106, and the PDC 109 aligns phasor measurements generated by the PMUs 109. Of course, other manners for synchronizing the PMUs 104 and 106 are also contemplated.

Phasor measurements generated by the PMUs 104 and 106 are utilized by the temperature calculator 110 to compute ohmic resistance of conductor lines on the power line 102. In one example, the temperature calculator 110 is implemented as described in U.S. Pat. No. 7,107,162, which is expressly incorporated by reference in its entirety herein. In an example, the PMUs 104 and 106 (or other devices) can output voltage phasor measurements $\hat{V}_1$ and $\hat{V}_2$ with respect to a first and second end of the line section 102, respectively, and the PMU 104 can additionally output a current phasor $\hat{I}_1$ with respect to the first end of the power line 102. The shunt impedance $jX_C$ of the power line 102 between the measurement points can be known and, for purposes of discussion can be assumed to be fairly constant. The temperature calculator 110 can calculate the impedance (Z) of the power line 102 as follows:

$$Z = \frac{\hat{V}_1 - \hat{V}_2}{\hat{I}_1 - \frac{\hat{V}_1}{jX_C}}; \qquad (1)$$

where the ohmic resistance R of the conductor lines in the power line 102 is the real part of the calculated impedance. The ohmic resistance is temperature dependent, and therefore the temperature calculator 110 can analyze reference temperatures and resistances to ascertain the prevalent average temperature of the conductor sections in the power line 102.

The sag calculator 112 receives the temperature and computes at least one of various sag metrics. More particularly, the sag calculator 112 can compute a sag for a span based upon a calculated span that is representative of all the spans within the power line 102. In accordance with another aspect, the sag calculator 112 can directly compute a sag with respect to a single span or multiple spans of interest in the power line 102.

Figure 2:
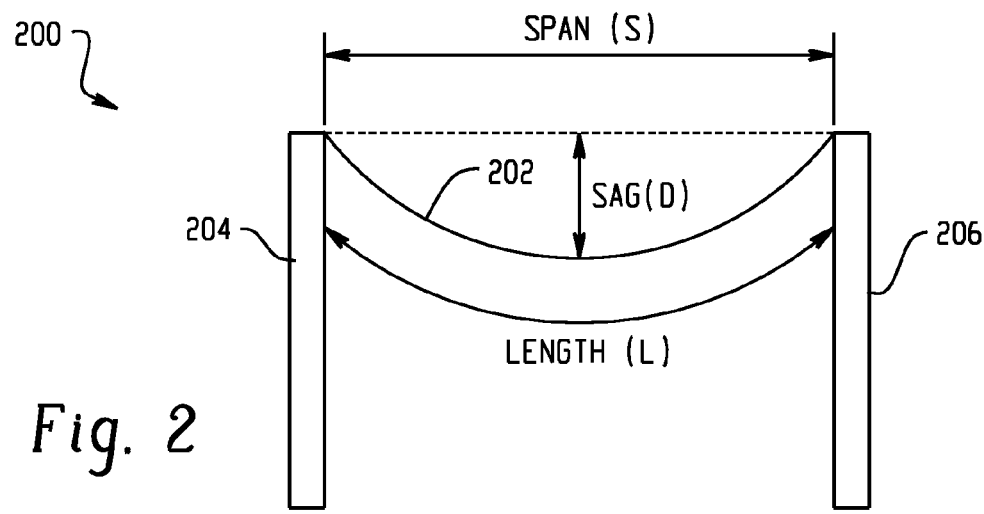
FIG. 2 depicts a span of a power line.

Referring briefly to FIG. 2, nomenclature for variables calculated by the sag calculator 112 or employed by the sag calculator 112 in connection with determining sag is illustrated through description of a particular span 200, wherein length of the span is denoted as S. The span 200 includes a wire conductor section 202 that is supported by two support structures 204 and 206, respectively. A power line includes multiple such spans, and therefore includes multiple wire conductor sections. The length of the wire conductor section 202 is denoted as L, and an amount of sag with respect to the span 200 is denoted as D. It is to be understood that a physical power line at least has three wire conductors carrying three phase power in parallel between the support structures 204 and 206 (e.g., at least one wire per phase). Power systems are, to the extent that it is possible, operated in a balanced fashion, and a power line is designed such that all conductors for the three phases have substantially similar length, resistance, etc. Thus, for the purposes of the present discussion it is sufficient to discuss one conductor in the wire conductor section 102 between the support structures 204 and 206.

Turning back to FIG. 1, the sag calculator 112 may take into consideration the interaction between thermal expansion and tension changes in the power line 102 when determining sag for one or more spans of the power line 102. The data repository 114 retains a reference temperature $T_0$ as well as length $L_{T_0}$ of a conductor of a particular span in the line section 102 at the reference temperature $T_0$. The length $L_{T_0}$ reflects an equilibrium point of tension and sag characteristics of the line section at the reference temperature $T_0$. Accordingly, when the temperature of conductor lines in the line section 102 or a portion thereof $T_1$ (as computed through utilization of phasor measurements) differs from the reference temperature $T_0$, it is desirable to locate an equilibrium tension and sag point with respect to the measured/computed temperature $T_1$.

An adjustment can be made for an effect of non-zero tension on line length to determine such an equilibrium tension/sag point. This adjustment is based at least in part upon a calculation of a zero tension length for a conductor line of a span of interest at the reference temperature $T_0$. The sag calculator 112 can determine this zero tension length as follows:

$$ZTL_{T_0} = L_{T_0}\left(1 + \frac{-H_{T_0}}{(Ec)(A)}\right); \quad (2)$$

where $H_{T_0}$ is the tension in the conductor in the power line at the reference temperature $T_0$, $ZTL_{T_0}$ is the zero-tension length for the conductor line at $T_0$, Ec is Young's Modulus of the material that makes up the conductor, and A is the cross sectional area of the conductor.

From the reference length $L_{T_0}$ the equilibrium sag and tension at the reference temperature $T_0$ can be calculated as follows:

$$D_{T_0} = \sqrt{\frac{3S(L_{T_0} - S)}{8}}; \quad (3)$$

$$H_{T_0} = \frac{wS^2}{8D_{T_0}}; \quad (4)$$

where $D_{T_0}$ is an amount of sag of the conductor in the span that corresponds to $L_{T_0}$, S is a length of the span of interest, $H_{T_0}$ is the tension of the conductor that corresponds to $L_{T_0}$, and w is the weight per unit distance (e.g., pounds per foot) for the conductor material in the power line 102.

A first length of a conductor in a span of interest is calculated as follows, wherein, initially, elongation/contraction of the span is calculated without regard to tension:

$$ZTL_{T_1} = ZTL_{T_0}(1 + \beta(T_1 - T_0)); \quad (5)$$

where $ZTL_{T_1}$ is a length of the conductor line at the measured temperature $T_1$ (which corresponds to the zero tension length for the conductor line at $T_0$) and $\beta$ is the (linear) coefficient of thermal expansion of the material of the conductor line. It can be discerned, however, that the conductor is associated with an amount of tension, as length of the conductor has changed.

The sag calculator 112 then computes a first tension that coincides with $ZTL_{T_1}$ in the following manner:

$$ZTD_{T_1} = \sqrt{\frac{3S(ZTL_{T_1} - S)}{8}}; \quad (6)$$

$$ZTH_{T_1} = \frac{wS^2}{8ZTD_{T_1}}; \quad (7)$$

where $ZTD_{T_1}$ is an amount of sag of the span that corresponds to $ZTL_{T_1}$ and $ZTH_{T_1}$ is the first tension of the conductor that corresponds to $ZTL_{T_1}$.

The sag calculator 112 then computes a second length of the conductor, wherein the second length is a function of the tension computed in (7). The second length is computed as follows:

$$L_{T_1} = ZTL_{T_1}\left(1 + \frac{ZTH_{T_1}}{(Ec)(A)}\right); \quad (8)$$

where $L_{T_1}$ is a length of the conductor of the span of interest at the measured temperature $T_1$.

An amount of tension in the conductor that corresponds to $L_{T_1}$ is then computed by the sag calculator 112:

$$D_{T_1} = \sqrt{\frac{3S(L_{T_1} - S)}{8}}; \quad (9)$$

$$H_{T_1} = \frac{wS^2}{8D_{T_1}}; \quad (10)$$

where $D_{T_1}$ is an amount of sag that corresponds to $L_{T_1}$, and $H_{T_1}$ is an amount of tension that corresponds to $L_{T_1}$.

The first tension in the conductor is then updated:

$$ZTH_{T_1} = \mu ZTH_{T_1} + (1-\mu)H_{T_1}; \quad (11)$$

where $\mu$ is a value that can be determined empirically, such as a value that is proximate to 0.5. The resultant value for $ZTH_{T_1}$ can then be placed into equation (8), and equations (8)-(11) can be repeated until values of $H_{T_1}$ and $L_{T_1}$ converge. For instance, over two iterations the value of $H_{T_1}$ may not change by a particular value and the value of $L_{T_1}$ may not change by a certain value. Upon these values converging within a specified range, the sag calculator 112 can output an estimate of sag for the span of interest, wherein the sag is computed by way of equation (9).

While the system 100 has been described in connection with calculating sag for a particular span using an approach that takes effects of tension on conductor length into account, it is understood that other approaches can be utilized to estimate sag. Pursuant to an example, given an average temperature of the powerline 102 from the temperature calculator 110, the sag calculator 112 can use equation (5) to determine a length of a conductor of a particular span i without taking tension into account. In such an instance, $ZTL_{T_1} = L_{T_1}$, and sag can be estimated through use of equation (9). Additionally, other iterative and non-iterative approaches are contemplated, as well as the use of more elaborate models that capture the relationship between power line length, temperature and tension. For instance the linear relationships in Equations (2), (3), (4), and (5) can be substituted with quadratic functions. While not discussed in detail, the use of more elaborate models is contemplated and intended to fall under the scope of the hereto-appended claims.

In another example, the sag calculator 112 may compute sag with respect to a span that is representative of other spans in the power line 102, and thereafter calculate sag of a particular span in the power line 102 based upon the sag of the representative span. The well known (virtual) Ruling Span is an example of such a representative span. Continuing with the virtual ruling span example, length of a virtual ruling span can be computed as follows:

$$S_R = \sqrt{\frac{\sum_{i=1}^{N}(S_i)^3}{\sum_{i=1}^{N}S_i}}; \quad (12)$$

where N is a total number of spans utilized in connection with determining the length of the Ruling Span of the power line 102. Thereafter, an estimate of the sag of the Ruling Span at a reference temperature $T_0$ (which can differ from the reference temperature described above) can be calculated as follows:

$$D_{T_0,R} = \text{mean}\left(D_{T_0,i}\left(\frac{S_R}{S_i^2}\right)\right); \quad (13)$$

where values of $D_{T_h,l}$ are known a priori.

Resulting values for $S_R$ and $D_{T_0,R}$ can be placed in the following equation to determine the length of the conductor in the Ruling Span at the reference temperature:

$$L_{T_0,R} = \frac{8D_{T_0,R}^2}{3S_R} + S_R. \quad (14)$$

The length of the conductor in the Ruling Span at a temperature calculated by the temperature calculator 110 may then be determined as follows:

$$L_{T_1,R} = L_{T_0,R}(1+\beta(T_1-T_0)); \quad (15)$$

where β is a coefficient of thermal expansion for the conductor material, which may depend on a value of $T_0$. Alternatively, the sag calculator 112 can utilize the approach described above (where tension is taken into account) to determine a length of the conductor with respect to the Ruling Span at the measured/calculated temperature.

A sag of the Ruling Span given a temperature ascertained by the temperature calculator 110 can be determined as a function of the length of the conductor (of the Ruling Span) at the determined temperature and the length of the Ruling Span:

$$D_{T_1,R} = \sqrt{\frac{3S_R(L_{T_1,R} - S_R)}{8}}. \quad (16)$$

The sag calculator 112 can also calculate sag for any particular span i based at least in part upon a computed sag of the Ruling Span:

$$D_{T_1,i} = D_{T_1,R}\left(\frac{S_i}{S_R}\right)^2. \quad (17)$$

As can be discerned from the above, the sag calculator 112 can compute sag as a function of a temperature of the power line 102 determined by way of phasor measurements generated by the PMUs 104 and 106 and parameters of the power line 102 that are retained within the data repository 114. Thus, the calculations undertaken by the sag calculator 112 are not necessarily dependent upon data from devices that are locally fixed at a particular span. Additionally, the sag calculator 112 can take mechanical creep of conductors into account when computing sag of a span of interest.

Calculated sag generated by the sag calculator 112 can be received by a logger 116, which logs calculations of sag within the data repository 114, another data repository (not shown), or distributes logs across several data repositories. The logger 116 can index calculations of sag by time, power line, span of a power line, or the like. The trender 118 analyzes the indexed data and, for instance, generates predictions for sag based upon current computed sag and previously computed sags, corresponding temperatures, current loads on the line section 102, prospective loads on the line section 102, changes in temperature with respect to time, etc. The trender 118 can employ various machine learning techniques and systems in connection with discerning patterns within the logged data, including artificial neural networks, Support Vector Machines (SVMs), Bayesian networks, k-nearest neighbor techniques, amongst others.

The notifier 120 also receives sag calculated by the sag calculator 112 and can notify an operator if, for instance, a computed sag is above a threshold. In another example, the notifier 120 can, from time to time, transmit notifications to an operator, a computer, or an operator and a computer to indicate a computed sag. Additionally, while not illustrated as such, the notifier 120 can be in communication with the trender 118, and can transmit notifications to an operator, a computer, or an operator and a computer based upon patterns ascertained by the trender 118 or predictions output by the trender 118. The notifications output by the notifier 120 can be any suitable notifications, including emails, text messages, voice messages, alarms, etc.

Additionally, phasor measurements generated at one or more devices (e.g., PMUs) can be employed to estimate phasor measurements at another portion of the power network power line 102. This can be accomplished if line parameters of a particular line are known. In a detailed example, a first power line may exist between first and second nodes, and a second power line may exist between second and third nodes, wherein it is desirable to compute sag with respect to the first power line. Additionally, line parameters may be known with respect to the second power line. However, devices that can output time-synchronized voltage and current measurements may only exist at the first and third nodes. The device at the third node can be used to infer what measurements would be at the second node, and thereafter ohmic resistance for such line can be computed (as well as temperature and sag).

It is to be understood that the modules shown and described herein can be hardware, software, or a combination thereof. For instance, the modules may be computer programs retained within memory of a device which are executable by a processor with access to the memory. Additionally, as utilized in the claims, the term apparatus is intended to encompass several computing devices that perform distributed computing with respect to a single process (e.g., functions of the sag calculator 112) as well as a single computing device that executes a process.

Figure 3:
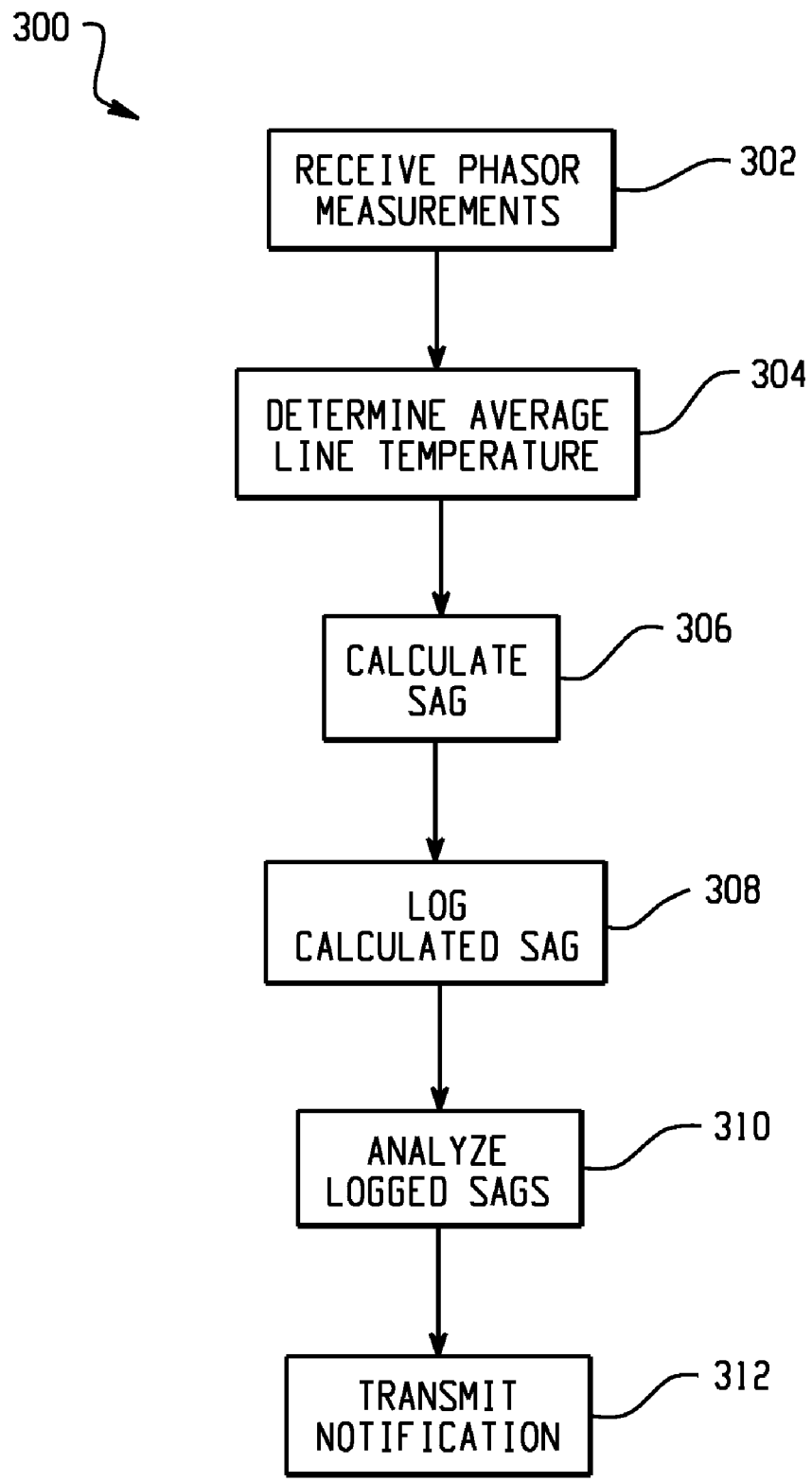
FIG. 3 depicts a method for estimating sag for a span of a power line.

Referring now to FIG. 3, a methodology 300 for computing an estimate of sag of a particular span of a power line is illustrated. While for purposes of simplicity of explanation the methodology is shown and described as a series of acts, it is understood and appreciated that the claimed subject matter is not to be limited by the order of execution of the acts, as some acts may occur in a different order or concurrently with other acts from that shown and described herein. Moreover, not all illustrated acts may be required to implement a methodology in accordance with the hereto-appended claims.

At 302, phasor measurements are received from PMUs, which can be positioned at a desired location or locations in an electrical power transmission and distribution system; for example, at ends of a line section that includes multiple spans. At 304, a temperature of conductor sections in the power line is determined as a function of phasor measurements generated by the two or more devices that are configured to output time-synchronized voltage and/or current values, such as PMUs. At 306, sag of one or more spans within the power line is calculated based at least in part upon the determined temperature of conductor sections in the power line. For example, sag for one or more spans of interest can be directly computed as described above. In another example, sag can be computed for a span that is representative of all spans within a power line, and such sag can be utilized in connection with calculating sag for a particular span of interest. Moreover, sag for a span of interest can be computed based at least in part upon a calculated length of a conductor in the span, wherein the length can take into consideration changes in tension given alterations in temperature.

At 308, computed sag (which may be estimates of sag) can be logged into one or more data repositories, and at 310 such logged data can be analyzed for trends therein. Additionally, at 312 a notification may be transmitted based upon a calculated sag.

Instructions described herein can be retained within memory of one or more computing devices and executed by one or more processors. Additionally, calculated estimates of sag may be stored in a Supervisory Control and Data Acquisition (SCADA) system, an Energy Management System (EMS), or other suitable system utilized in power transmission and distribution systems. Additionally, calculated estimates of sag may be stored upon user devices, such a personal digital assistant, a personal computer, a server, etc., and output to a monitor, a printer, a speaker, etc.

Of course, modifications and alterations will occur to others upon reading and understanding the preceding description. It is intended that the invention be construed as including all such modifications and alterations insofar as they come within the scope of the appended claims or the equivalents thereof.

What is claimed is:

1. A computer-implemented method comprising the following computer-executable acts:
   receiving a conductor temperature of a power line, wherein the temperature is determined based at least in part upon time-synchronized voltage and current phasor measurements; and
   using a computer to compute the sag for a span of interest in the power line based at least in part upon the received temperature,
   wherein computing the sag for the span of interest comprises computing the sag as a function of both an iteratively updated first value indicative of a length of a conductor of the span of interest at the received temperature and an iteratively updated second value indicative of an amount of tension of the conductor at the received temperature, wherein the length and tension are iteratively updated until the first and second values converge to within respective predetermined ranges of values, and wherein computing the sag includes performing calculations that are not dependent upon data from devices that are locally fixed at the span of interest.

2. The method of claim 1, wherein computing the sag for the span of interest comprises computing a zero tension length for a conductor of the span at a reference temperature as a function of a known length of the conductor at the reference temperature and a cross sectional area of the conductor, and wherein computing the sag for the span of interest comprises computing a first length of the conductor at the received temperature as a function of the zero tension length for the conductor at the reference temperature, a coefficient of thermal expansion for a material of the conductor, and a difference between the reference temperature and the received temperature.

3. The method of claim 2, wherein computing the sag for the span of interest comprises calculating a first tension of the conductor at the received temperature based at least in part upon a weight per unit length of the conductor, a length of the span, and the computed first length of the conductor.

4. The method of claim 3, wherein computing the sag for the span of interest comprises computing a second length of the conductor at the received temperature as a function of the first length, the first tension, and the cross sectional area of the conductor.

5. The method of claim 4, wherein computing the sag for the span of interest comprises computing a sag of the span of interest at the received temperature as a function of the second length.

6. The method of claim 5, wherein computing the sag for the span of interest comprises computing a second tension of the conductor as a function of the computed sag of the span, the second length, and the weight per unit length of the conductor.

7. The method of claim 6, wherein computing the sag for the span of interest comprises updating the first tension of the conductor at the received temperature as a function of the first tension and the second tension.

8. The method of claim 7, wherein computing the sag for the span of interest comprises:
   recomputing the second length;
   recomputing the sag of the span of interest at the received temperature;
   recomputing the second tension of the conductor;
   determining whether the computed second length has converged;
   determining whether the computed second tension has converged;
   outputting the calculated sag of the span of interest if the computed second length and the computed second tension have converged, respectively; and
   updating the first tension if the computed second length and the computed second tension have not converged, respectively.

9. The method of claim 1, further comprising computing sag for a span that is representative of multiple spans in the power line.

10. The method of claim 9, wherein the computed sag for the span of interest is determined as a function of the computed sag for the representative span.

11. The method of claim 1, wherein the power line includes a first end and a second end, and further comprising:
    receiving phasor measurements from two phasor measurement units that are positioned at the first end and the second end of the power line, respectively; and
    determining the temperature of the conductor in the power line as a function of the received phasor measurements.

12. The method of claim 1, further comprising:
    determining an ohmic resistance of the conductor in the power line; and
    determining the temperature as a function of the ohmic resistance.

13. The method of claim 1, wherein computing the sag for the span of interest comprises computing the sag based at least in part upon a relationship between thermal expansion of and tension in conductors in the power line.

14. The method of claim 1, wherein computing the sag for the span of interest comprises including an effect of mechanical creep when determining a length and tension of a conductor in the span of interest.

15. An apparatus, comprising:
    a sag calculator that computes, in real time during an operation of a power line, a sag for a span in the power line based at least in part upon a determined time-varying temperature of a conductor in the power line, wherein the time-varying temperature is determined as a function of phasor measurements generated by one or more devices at vertices of the power line during the operation of the power line.

16. The apparatus of claim 15, wherein the sag calculator computes a sag for a Ruling Span.

17. The apparatus of claim 16, wherein the sag calculator computes the sag for the span as a function of the sag for the Ruling Span.

18. The apparatus of claim 15, further comprising a logger that logs a plurality of sags computed by the sag calculator over time.

19. The apparatus of claim 18, further comprising a trender that discerns trends in data logged by the logger.

20. The apparatus of claim 15, further comprising a temperature calculator that determines the temperature of the conductor based at least in part upon the phasor measurements.

21. The apparatus of claim 15, further comprising a notifier that transmits a notification to an operator, wherein the notification is based at least in part upon the sag computed by the sag calculator.

22. The apparatus of claim 15, wherein the sag calculator iteratively computes a tension of the conductor line of the span and a length of the conductor at the determined temperature until the computed tension and the computed length converge, and further wherein the length is employed to determine the sag for the span.

23. A computer-readable medium comprising computer-executable instructions for:
calculating, in real time during the operation of a power line, the time-varying sag for a span of the power line based at least in part upon a time varying temperature of conductors in the line section, wherein the temperature is ascertained through analysis of phasor measurements obtained during the operation of the power line; and
storing the calculated sag.

24. The computer-readable medium of claim 23 comprising further computer-executable instructions for:
computing an ohmic resistance of the conductors based at least in part upon phasor measurements generated by phasor measurement units; and
determining the temperature of the conductors based at least in part upon the computed ohmic resistance.

25. The computer-readable medium of claim 23 comprising further computer-executable instructions for calculating the sag for the span based at least in part upon a length of a conductor of the span at a known reference temperature.

26. The computer-readable medium of claim 23 comprising further computer-executable instructions for calculating the sag for the span based at least in part upon a tension of a conductor of the span at a known reference temperature.

27. The computer-readable medium of claim 23 wherein the sag calculation does not account for a tension of the power line.

\* \* \* \* \*